US009393627B2

(12) United States Patent
Hirasaka et al.

(10) Patent No.: US 9,393,627 B2
(45) Date of Patent: Jul. 19, 2016

(54) TURRET DEVICE

(71) Applicant: SUGINO MACHINE LIMITED, Uozu, Toyama Prefecture (JP)

(72) Inventors: Nagahiro Hirasaka, Shimoniikawa-gun (JP); Shun Fujita, Toyama (JP); Takashi Mori, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 13 days.

(21) Appl. No.: 14/468,738

(22) Filed: Aug. 26, 2014

(65) Prior Publication Data

US 2015/0075573 A1 Mar. 19, 2015

(30) Foreign Application Priority Data

Sep. 17, 2013 (JP) ................................. 2013-191645

(51) Int. Cl.
*B23B 29/32* (2006.01)
*B08B 3/04* (2006.01)
*B08B 3/02* (2006.01)
*B08B 1/00* (2006.01)

(52) U.S. Cl.
CPC ................. *B23B 29/323* (2013.01); *B08B 1/00* (2013.01); *B08B 3/02* (2013.01); *B08B 3/04* (2013.01); *B23B 2270/28* (2013.01); *B23Q 2220/002* (2013.01); *Y10T 408/37* (2015.01)

(58) Field of Classification Search
CPC .... B23B 29/232; B23B 2270/28; B08B 1/00; B08B 3/02; B08B 3/04; B23Q 2220/002; Y10T 408/37
USPC ........................................................ 134/172
See application file for complete search history.

(56) References Cited

U.S. PATENT DOCUMENTS

| 4,081,111 | A | * | 3/1978 | Sandow | .............. | B05B 11/3001 |
| | | | | | | 222/309 |
| 5,535,496 | A | * | 7/1996 | Sugino | ...................... | B08B 3/02 |
| | | | | | | 29/39 |
| 5,727,297 | A | * | 3/1998 | Sahm | .................... | B23B 29/323 |
| | | | | | | 29/40 |
| 6,276,035 | B1 | | 8/2001 | Hessbruggen et al. | | |

FOREIGN PATENT DOCUMENTS

| DE | 102009022815 | B3 | * | 11/2010 | ............ B23B 29/323 |
| EP | 0669187 | A2 | | 8/1995 | |
| EP | 0742063 | A1 | | 11/1996 | |

(Continued)

OTHER PUBLICATIONS

Dec. 15, 2014 Extended Search Report issued in European Application No. 14184232.8.

*Primary Examiner* — Karla Moore
*Assistant Examiner* — Tinsae Ayalew
(74) *Attorney, Agent, or Firm* — Oliff PLC

(57) ABSTRACT

To provide a turret device used for turret-type cleaning machines which allows an improvement in the mounting accuracy of a turret drive shaft, a drive shaft, and a turning center shaft of a turret. A turret device includes: a spindle; a turret mounting the spindle; a spindle drive device; a turret drive device; a turret drive shaft disposed coaxially with a turning center shaft of the turret; a drive shaft coaxially journaled within the turret drive shaft; a first transmission portion transmitting rotation of the turret drive shaft to the turret; a second transmission portion transmitting rotation of the drive shaft to the spindle through a center shaft; and an engaging portion realizing engagement between the center shaft and the spindle when the turret is indexed and releasing the engagement when the turret is turning.

8 Claims, 6 Drawing Sheets

(56) References Cited

FOREIGN PATENT DOCUMENTS

| EP | 1048401 | A2 | 11/2000 |
|----|---------|----|---------|
| JP | B2-3065905 | | 7/2000 |
| JP | B2-3684117 | | 8/2005 |
| JP | A-2011-230118 | | 11/2011 |

* cited by examiner

TURRET DEVICE

BACKGROUND

1. Field of the Invention

The present invention relates to a turret device used for turret-type cleaning machines for deburring or cleaning workpieces with a nozzle or a rotary tool.

2. Related Art

A turret-type cleaning machine (see Japanese Patent Nos. 3065905 and 3684117) is one of the machines for cleaning or deburring parts subjected to milling or drilling. This turret-type cleaning machine includes a high-pressure water jet nozzle or a deburring rotary tool on each shaft of a turret, and is configured to clean holes or work surfaces or deburr edges by turning the turret to jet high pressure water from the nozzle mounted to the turret or rotate various rotary tools depending on the intended use.

This kind of turret-type cleaning machine has a mainly numerically controlled, orthogonal axis direction moving device on a frame, and a turret device is disposed on the orthogonal axis direction moving device. Also, the turret-type cleaning machine has a cleaning chamber surrounding the turret located at the front of the turret device, to clean and deburr a workplace, as an object to be cleaned, with the nozzle or rotary tool mounted to the turret.

Furthermore, this turret-type cleaning machine includes the cleaning machine (see Japanese Published Unexamined Patent Application No. 2011-230118), in which a turret turning motor (turret drive device) and a spindle motor (spindle drive device) are disposed outside the cleaning chamber, and a turn drive shaft (turret drive shaft) and a spindle drive shaft (drive shaft) are arranged in parallel to enhance durability and reliability of the machine.

However, the cleaning machine disclosed in the Japanese Published Unexamined Patent Application No. 2011-230118 includes the three rotating shafts of the turret drive shaft, the drive shaft, and a turning center shaft of the turret. Therefore, it has been difficult to mount the three rotating shafts with high relative positional accuracy.

SUMMARY

Accordingly, the present invention has been made in view of the foregoing, and an object of the present invention is to provide a turret device used for turret-type cleaning machines which allows an improvement in the mounting accuracy of a turret drive shaft, a drive shaft, and a turning center shaft of a turret.

In order to achieve the above-mentioned object, an aspect of the present invention provides a turret device used for turret-type cleaning machines for deburring or cleaning workplaces with a nozzle or a rotary tool. The turret device includes: a spindle; a turret; a spindle drive device; a turret drive device; a turret drive shaft; a drive shaft; a first transmission portion; a second transmission portion; and an engaging portion. The spindle mounts the nozzle or the rotary tool. The turret has a plurality of turret faces mounting the spindle. The spindle drive device has a function of indexing a rotation angle of the spindle. The turret drive device turns and indexes the turret. The turret drive shaft as a hollow shaft is disposed coaxially with a turning center shaft of the turret and journaled in a quill. The turret drive shaft transmits power of the turret drive device. The drive shaft is coaxially journaled within the turret drive shaft. The drive shaft transmits rotation of the spindle drive device. The first transmission portion transmits rotation of the turret drive shaft to the turret. The second transmission portion has an output shaft. The second transmission portion transmits rotation of the drive shaft through the output shaft to the spindle specified by the index of the turret. The engaging portion realizes engagement between the output shaft and the spindle when the turret is indexed and releases the engagement when the turret is turning.

According to the aspect of the present invention, because the turret drive shaft, the drive shaft, and the turning center shaft of the turret are coaxially arranged, the assembly dimensional accuracy of components is improved and the transmission of power for turning the turret and rotating the spindle is optimized.

That is, it is possible to provide the turret device used for turret-type cleaning machines which allows an improvement in the mounting accuracy of the turret drive shaft, the drive shaft, and the turning center shaft of the turret.

Furthermore, the turret device includes the second transmission portion and the engaging portion, and thus the rotation of the spindle drive device is transmitted through the drive shaft only to the spindle specified by the index of the turret out of the plurality of spindles disposed on the turret. This provides the advantages of allowing the use of only the power to be required and facilitating operation confirmation by specifying a portion to be driven.

Furthermore, preferably, the turret device according to the aspect of the present invention further includes a clamping member, a clamping member moving portion, and a detector. The clamping member clamps the turret. The clamping member moving portion moves the clamping member between two positions, i.e., a clamping position where the turret is clamped and an unclamping position where the turret is released. The detector detects whether the clamping member is in a position retracted from a turning region of the turret.

With this construction, the turret with the angle indexed, that is, the turret with the rotation angle positioned, is fixed by the clamping member, thereby preventing the turret from being displaced in a circumferential direction. Furthermore, because it can be detected that the clamping member is in a position retracted from the turning region of the turret, when the clamping member is in a position retracted from the turning region of the turret, the turret is turned, thereby preventing interference between the turret and the clamping member.

Moreover, preferably, the turret device according to the aspect of the present invention further includes a groove of generally V-shaped cross section moving in conjunction with the turret, wherein the clamping member is a plunger that includes a protrusion of generally V-shaped cross section having a shape corresponding to the groove, and the plunger clamps the turret, with the protrusion abutting against and urging the groove in the clamping position.

With this construction, the generally V-shaped cross section of the protrusion of the plunger abuts against and urges the groove of generally V-shaped cross section moving in conjunction with the turret to cause the component forces of the urging force to act in the direction perpendicular to the two side surfaces of the groove of generally V-shaped cross section, thereby allowing reliable clamping of the turret.

Here, the term "generally V-shaped cross section" refers to the cross-sectional shape in which extension faces on the two sides is erected in the form of the letter V from a crossing portion thereof, regardless of the presence/absence of a bottom of the crossing portion of the V or the shape of the bottom.

Also, in the turret device according to the aspect of the present invention, the first transmission portion may include: a drive gear provided on the turret drive shaft; an idler gear meshing with the drive gear; and an internal gear provided on the turret to mesh with the idler gear, and the groove may be included in the internal gear provided on the turret.

With this construction, the rotation of the turret drive shaft is transmitted to the turret through the idler gear, thereby allowing reliable transmission of power.

Furthermore, the plunger is inserted into the groove included in the internal gear that is provided on the turret and to which the rotation from the turret drive shaft is directly transmitted, thereby reliably restraining the turret from turning.

Further, in the turret device according to the aspect of the present invention, the output shaft may be a center shaft journaled coaxially with the spindle. The second transmission portion may further include a gear mechanism transmitting the rotation of the drive shaft to the center shaft. The engaging portion may include: a receiving portion as a recessed groove provided at one end of the center shaft and the spindle and extending linearly; and a locking piece as a protruding portion provided at the other end of the center shaft and the spindle and engageable with the receiving portion for transmission of rotation. The locking piece and the receiving portion may be disengaged by turning the turret in a state where an extending direction of the receiving portion is positioned parallel to a trajectory of the spindle drawn by the turning of the turret, and may be engaged when the turret is indexed.

With this construction, the second transmission portion and the engaging portion can be simply constructed.

In addition, preferably, the turret device according to the aspect of the present invention further includes: a rotating manifold disposed on the turret coaxially with the turning center shaft of the turret; and a flow passage communicating from the rotating manifold to the spindle.

With this construction, the supply of cleaning liquid to the spindle rotatably mounted to the turret faces can be realized by a simple construction.

According to the aspect of the present invention, the present invention is to provide the turret device used for turret-type cleaning machines which allows an improvement in the mounting accuracy of the turret drive shaft, the drive shaft, and the turning center shaft of the turret.

BRIEF DESCRIPTION OF THE DRAWINGS

Embodiments of the present invention will be described in detail based on the following drawings, in which:

FIGS. 1A and 1B illustrate a whole cleaning machine incorporating a turret device according to an embodiment of the present invention, wherein FIG. 1A is a front view, and FIG. 1B is a right side view;

DETAILED DESCRIPTION

Embodiments of the present invention will be described in detail with reference to the accompanying drawings as necessary.

[General Construction of Cleaning Machine]

Figure 1B:
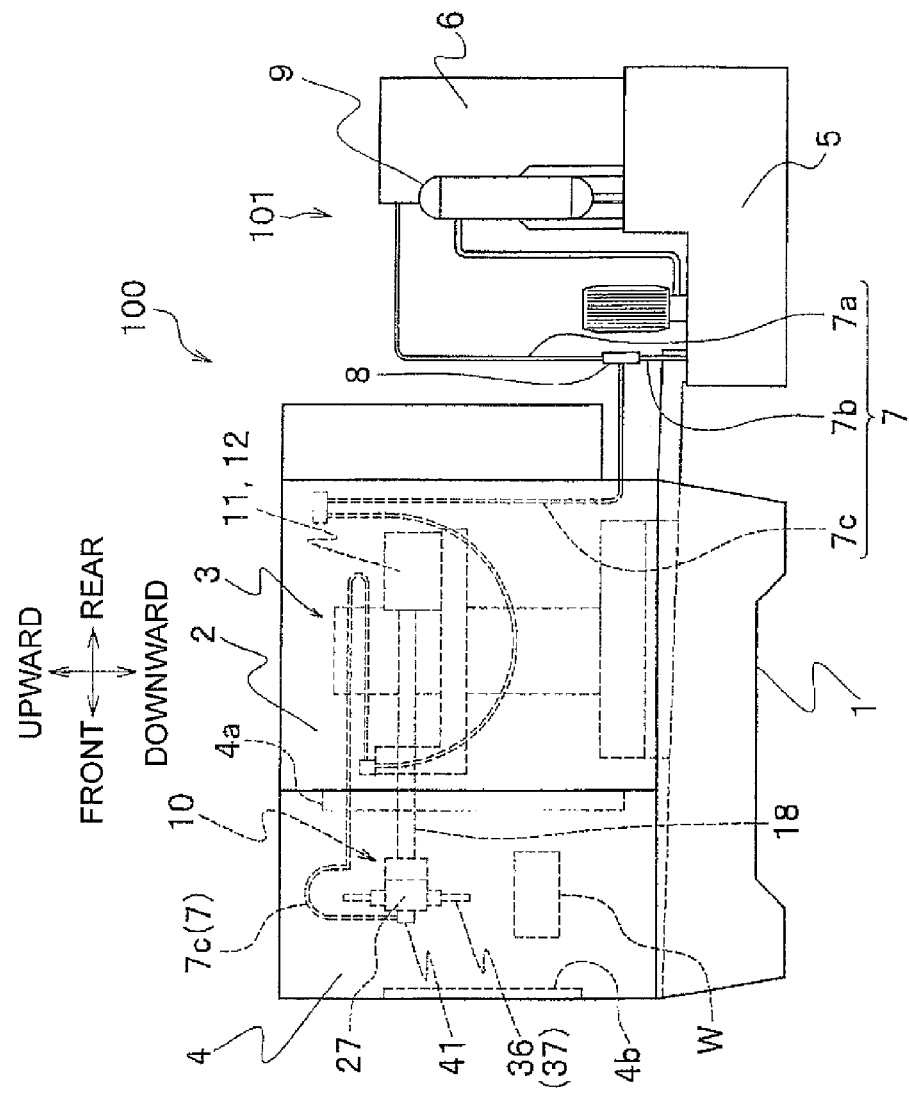
Figure 1A:
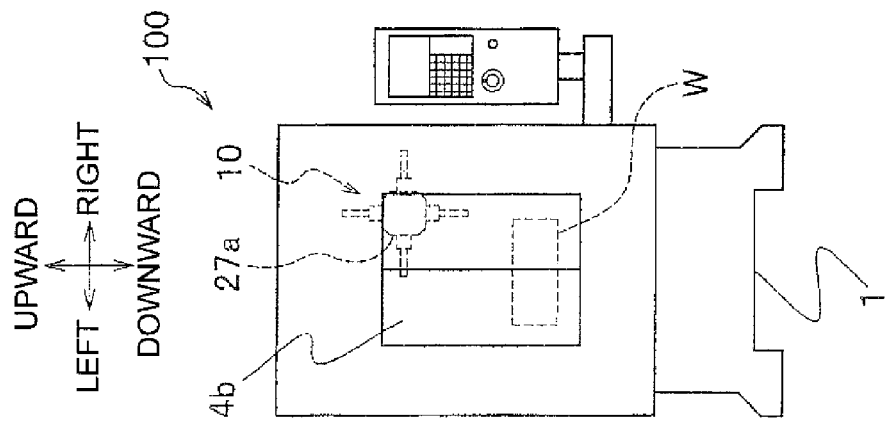

As shown in FIGS. 1A and 1B, a machine chamber 2 is disposed on a frame 1 of a cleaning machine 100 to the rear. The machine chamber 2 is internally provided with a numerically controlled, orthogonal moving device 3 for realizing movement in orthogonal triaxial directions. It is to be noted that, for clarity of the explanation, directions, such as front, rear, left, right, upward, and downward, are set as shown in FIGS. 1A and 1B. A cleaning chamber 4 is disposed on the frame 1 to the front, and a turret device 10 is installed on the moving device 3. The cleaning chamber 4 has a front opening (not shown) and includes a shutter 4b that can seal the opening. Also, the cleaning chamber 4 is provided with a rear opening (not shown) that allows the turret device 10 to pass between the machine chamber 2 and the cleaning chamber 4. The rear opening is closed to the machine chamber 2 by a cover 4a such as a bellows cover and a telescopic cover. A quill 18 of the turret device 10 penetrates the cover 4a. A turret 27 is stored in the cleaning chamber 4, while a turret drive device 12 and a spindle drive device 11 are stored in the machine chamber 2.

A cleaning liquid tank unit 101 is disposed at the rear of the cleaning machine 100. The cleaning liquid tank unit 101 includes a cleaning liquid tank 5, a high-pressure pump 6, a valve device 8, and a filtering device 9. The valve device 8 distributes high-pressure cleaning liquid discharged from the high-pressure pump 6 and passing through a pipe 7a to a pipe 7b for returning the high-pressure cleaning liquid into the cleaning liquid tank 5 or a pipe 7c for supplying the high-pressure cleaning liquid to the turret 27.

By the high-pressure pump 6, the discharged cleaning liquid is delivered to the turret device 10 through the pipe 7a, the valve device 8, and the pipe 7c. This cleaning liquid passes through the inside of the turret device 10 to be jetted from a rotatable nozzle 36 provided in the turret device 10. It should be noted that the nozzle 36 is a collective term for nozzles 36A and 36B, etc. (see FIG. 2).

The shutter 4b is opened and a workpiece W to be debarred or cleaned is put into the cleaning chamber 4. Thereafter, the shutter 4b is closed.

The cleaning liquid is increased in pressure by the high-pressure pump 6 and passes through the pipe 7 and the turret device 10 to be discharged from the nozzle 36. A jet of the cleaning liquid discharged from the nozzle 36 is directed at the workpiece W to remove dirt and burrs on the workpiece W. The nozzle 36 is precisely moved together with the turret device 10 by the moving device 3 to direct the jet onto the area of the workpiece W where dirt or burrs are stuck. Under the action of dynamic pressure of the jet, the dirt or burrs are removed from the workpiece W.

The cleaning liquid is collected in the cleaning liquid tank 5 together with the dirt or burrs and filtered by the filtering device 9. The filtered cleaning liquid is raised in pressure again by the high-pressure pump 6 to be used for cleaning.

After the completion of cleaning, the shutter 4b is opened and the workpiece W is taken out.

First Embodiment

Figure 2:
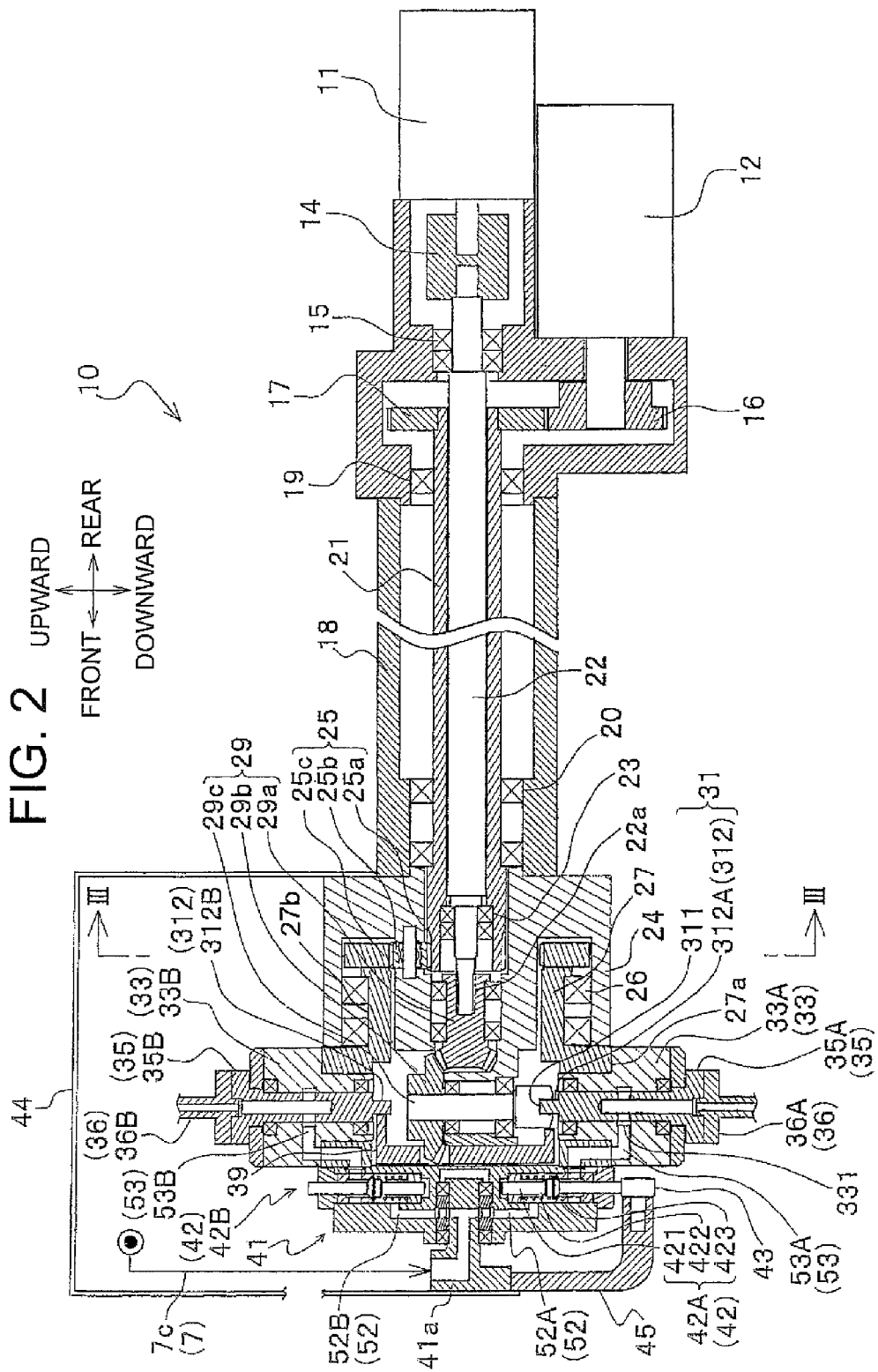
FIG. 2 is a longitudinal sectional view of the turret device shown in FIG. 1B according to a first embodiment of the present invention.

Referring mainly to FIG. 2, the turret device 10 according to a first embodiment of the present invention will be described. The turret device 10 includes: the quill 18; the spindle drive device 11 serving as a servomotor; the turret drive device 12 serving as a servomotor; a turret drive shaft 21; the turret 27 having a plurality of turret faces 27a; a first transmission portion 25 including a drive gear 25a, an idler gear 25b, and an internal gear 25c; a second transmission portion 29 including bevel gears 29a and 29b and a center shaft 29c; a spindle 35; an engaging portion 31 including a locking piece 312 of the spindle 35 and a receiving portion 311 of the center shaft 29c; a rotating manifold 41; and flow passages 52 and 53. It should be noted that: the spindle 35 is a collective term for spindles 35A and 35B, etc.; the locking piece 312 is a collective term for locking pieces 312A and 312B, etc.; the flow passage 52 is a collective term for flow passages 52A and 52B, etc.; and the flow passage 53 is a collective term for flow passages 53A and 53B, etc.

<Drive Device>

In this embodiment, the quill 18 has a cylindrical shape.

It should be noted that the quill 18 may have any cross-sectional shape as long as it has a hollow shape (tubular shape) inside which the turret drive shaft 21 and a drive shaft 22 can be disposed, and the outline of the cross section can be freely selected from shapes such as rectangular shape and hexagonal shape. If the quill 18 has a hollow polygonal shape, the turret drive shaft 21 is provided in the vicinity of the center of gravity of the cross section of the quill 18.

The spindle drive device 11 is disposed at a rear end of the quill 18 in such a manner that an output shaft thereof is coaxial with the central axis of the quill 18. In this embodiment, the spindle drive device 11 is a servomotor and has a spindle rotation angle indexing function, that is, a rotation angle positioning function.

It should be noted that, a stepping motor with a resolver or an encoder may be used as the spindle drive device 11 in place of the servomotor.

The turret drive device 12 is disposed adjacent to the spindle drive device 11. A gear 16 is fixed to an output shaft of the turret drive device 12.

It should be noted that a stepping motor with a resolver or an encoder and other motors, or an angle indexing device with a roller gear cam mechanism, parallel cam mechanism, or barrel cam mechanism, or a rotating cylinder may be used as the turret drive device 12 in place of the servomotor. If a rotating cylinder is used, a hydraulic cylinder as an incompressible fluid cylinder or a pneumatic cylinder as a compressible fluid cylinder may be used.

The turret drive shaft 21 is journaled coaxially with the quill 18 by bearings 19 and 20 internally provided at each end of the quill 18. A gear 17 is fitted and fixed to a rear end of the turret drive shaft 21 and meshes with the gear 16 to thereby transmit the output of the turret drive device 12 to the turret drive shaft 21.

It should be noted that a toothed belt transmission mechanism may be used in place of the gear mechanism including the gears 16 and 17.

The drive shaft 22 is journaled coaxially with the turret drive shaft 21 by bearings 15 and 23 internally provided at each end of the turret drive shaft 21. The drive shaft 22 is connected to the spindle drive device 11 through a coupling 14.

The turret 27 has the plurality of turret faces 27a (see also FIG. 1A). The turret 27 is journaled by a bearing 26 internally provided at a turret base 24. The internal gear 25c is fastened to the rear of the turret 27, for example, by screws. A supporting member 33 is mounted to the turret faces 27a. It should be noted that the supporting member 33 is a collective term for supporting members 33A and 33B, etc. If the number of the nozzles 36 or rotary tools 37 to be used is less than the number of the turret faces 27a, a lid 38 is mounted in place of the supporting member 33 (see FIG. 4).

It should be noted that the number of the turret faces 27a can be freely changed. Although the turret faces 27a are arranged in parallel to the quill 18 and the turret drive shaft 21, the turret faces 27a may be provided on a plane (polygonal pyramid surface) inclined toward the front of the turret 27.

Figure 3:
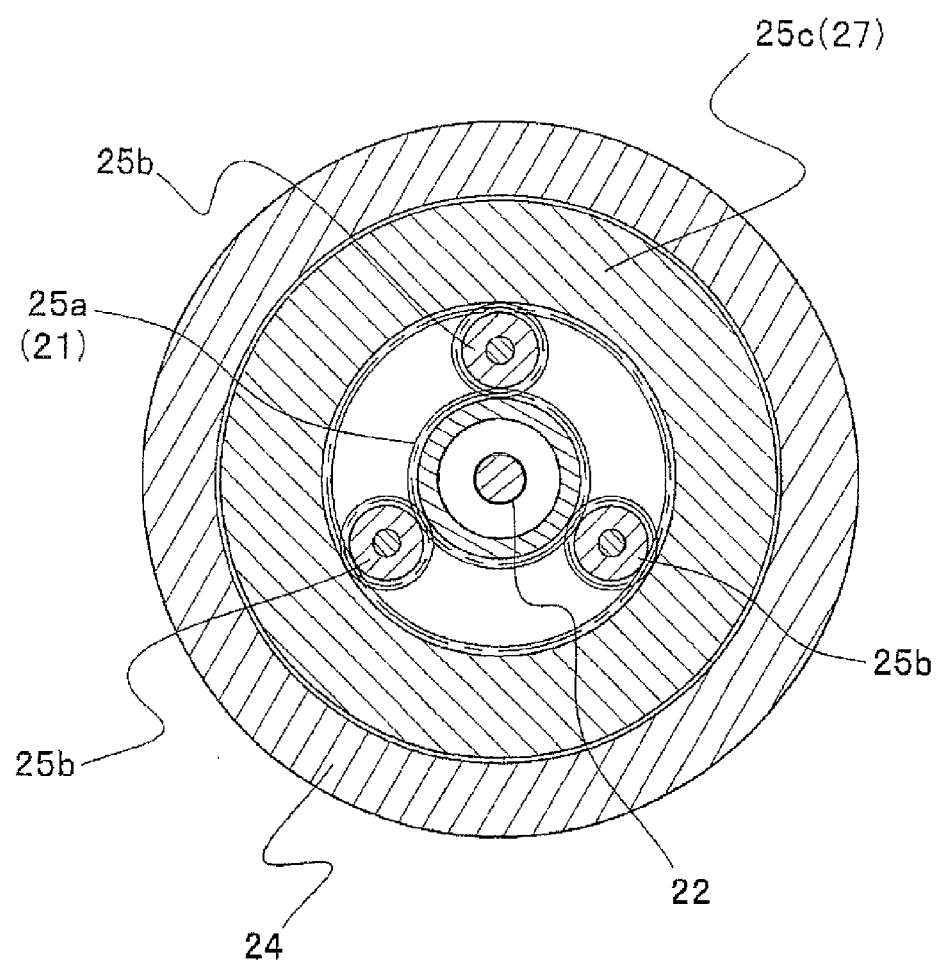
FIG. 3 is a sectional view taken along line III-III of FIG. 2.

The first transmission portion 25 transmits the rotation of the turret drive shaft 21 to the turret 27. The drive gear 25a is provided at a front end of the turret drive shaft 21. A plurality of the idler gears 25b journaled to the turret base 24 mesh with the drive gear 25a and the internal gear 25c fastened to the turret 27 meshes with the idler gears 25b to transmit the rotation of the turret drive shaft 21 to the turret 27. With the plurality of idler gears 25b, the forces exerted on gear teeth can be dispersed, so that a torque to be transmitted can be increased (see FIG. 3). In this embodiment, the drive gear 25a is integral with the turret drive shaft 21, but also can be separate from the turret drive shaft 21 and fixed thereto. Furthermore, in this embodiment, the internal gear 25c is separate from the turret 27 and fixed thereto, but also can be integral with the turret 27.

The plurality of idler gears 25b are preferably provided, but also can be changed to a single idler gear. In this embodiment, the number of the idler gears 25b is three, but also can be freely changed in accordance with design conditions.

It should be noted that a transmission mechanism which enables transmission with an input shaft and an output shaft coaxially arranged, such as a cycloidal speed reducer (see Japanese Published Unexamined Patent Application No. 2010-32038), an eccentric differential gearbox (see Japanese Patent Application No. 2011-531352), or an eccentric oscillation type gear device (see Japanese Published Unexamined Patent Application No. 2010-91073), may be used as the first transmission portion 25 in place of the gear mechanism.

The second transmission portion 29 is composed of the bevel gears 29a and 29b, and the center shaft 29c serving as an output shaft. In this embodiment, the bevel gears 29a and 29b constitute a gear mechanism. A spline 22a is provided at a front end of the drive shaft 22. The driving bevel gear 29a is splined to the spline 22a.

The center shaft 29c is journaled perpendicular to the turret faces 27a and within the turret 27. The driven bevel gear 29b is fitted to the center shaft 29c. The bevel gear 29b is secured to the center shaft 29c by a key, serrations, or the like.

With the bevel gear 29a and the bevel gear 29b in mesh with each other, the rotation of the drive shaft 22 is transmitted to the center shaft 29c.

It should be noted that the spline 22a may be replaced with serrations, a taper ring, a key and keyway, or other shaft fastening elements. Furthermore, a screw gear mechanism or worm gear mechanism, an Oldham's coupling, or a universal coupling may be selected as the second transmission portion 29 in place of the bevel gear mechanism.

The spindle 35 has cleaning liquid flow passages inside and is journaled in the supporting member 33 disposed on the turret faces 27a, coaxially with the center shaft 29c.

The engaging portion 31 includes: the receiving portion 311 as a slitting groove provided in the center shaft 29c; and the locking piece 312 having two approximately-parallel surfaces provided on the spindle 35. In this embodiment, the receiving portion 311 is a recessed groove which is provided at an end of the center shaft 29c and extends linearly, and the locking piece 312 is a protruding portion which is provided at an end of the spindle 35 and engageable with the receiving portion 311 for transmission of rotation.

In this embodiment, the locking piece 312 has a substantially flat plate shape, the surface width thereof being made slightly narrower than that of the receiving portion 311. When the turret face 27a is indexed, the locking piece 312 engages the receiving portion 311 so that the rotation of the center shaft 29c can be transmitted to the spindle 35.

The spindle drive device 11 is a servomotor having the indexing function, and its rotation is transmitted to the center shaft 29c and the spindle 35 through the drive shaft 22 and the second transmission portion 29, thereby allowing the spindle drive device 11 to optionally index an angle in a rotational direction of the spindle 35.

The locking piece 312A passes through the receiving portion 311 along with turning of the turret 27 when the groove of the receiving portion 311 faces a circumferential direction of the turret 27. The spindle 35 brought into engagement with the center shaft 29c until then goes out of it with the turning of the turret 27.

The spindle 35 disengaged from the center shaft 29c turns around the circumference of the turret 27. At this time, the locking piece 312 slides on a guide 39, and the spindle 35 does not rotate. Therefore, the locking piece 312 can pass smoothly through the receiving portion 311 along with the turning of the turret 27.

It should be noted that as the engaging portion 31, for example, the following clutch mechanism can be selected in place of the combination of the receiving portion 311 and the locking piece 312. The clutch mechanism includes: a pair of clutches that can be connected to each other; and an arm that turns on a fulcrum, in which a supporting member supporting one of the clutches is moved to a retracted position by the operation of the arm to thereby disconnect the clutch for disengagement, and moved to a connection position to thereby connect the clutch for engagement.

<Cleaning Liquid Flow Passage>

The rotating manifold 41 is disposed on the turret 27 coaxially with a turning center shaft 27b of the turret 27. A swivel shaft 41a fixed by a bracket 44 is inserted and fitted in a shaft center of the rotating manifold 41. The swivel shaft 41a is provided with a cleaning liquid inlet. The pipe 7c communicates with the cleaning liquid inlet. The cleaning liquid raised in pressure by the high-pressure pump 6 (see FIG. 12) passes through the pipe 7 and flows into the rotating manifold 41 through the inlet of the swivel shaft 41a. The rotating manifold 41 is provided with the same number of (four) outlets as the number of turret indexes (turret faces).

The same number of the cleaning liquid flow passages, such as 52A and 52B, as the number of turret faces communicate from the outlets of the rotating manifold 41 to the spindle 35 through the supporting members such as 33A and 33B disposed on the turret faces 27a. The cleaning liquid supplied from the high-pressure pump 6 flows through the rotating manifold 41 to all the spindles such as 35A and 35B provided on the turret faces 27a.

A cylindrical groove 331 is provided inside the supporting member 33, and the flow passage 53 is connected to the cylindrical groove 331. The spindle 35 is provided with a radial hole at a position in an axial direction thereof corresponding to the cylindrical groove 331. The cleaning liquid flow passage 53 communicates from the radial hole of the spindle 35 to a flange surface at the tip of the spindle 35 through an axial hole in the spindle 35.

It should be noted that the flow passages such as 52 and 53 need not necessarily be provided within the turret 27.

Preferably, poppet valves 42A and 42B are provided in between the flow passages 52 and 53 communicating from the rotating manifold 41 to the supporting member 33. The poppet valve 42 includes a valve element 421, a valve seat 423, and a coil spring 422. It should be noted that the poppet valve 42 is a collective term for the poppet valves 42A and 42B, etc. In the poppet valve (see 42B) which is not in contact with a cam follower 43, the valve element 421 abuts on the valve seat 423 while being urged toward the valve seat 423 by the coil spring 422 to close the flow passage.

The cam follower 43 is fixed to the bracket 45 disposed on the swivel shaft 41a.

When the turret face 27a is indexed by the turning of the turret 27, the cam follower 43 pushes up the valve element 421 of the poppet valve 42 communicating with the spindle 35 connected to the center shaft 29c against the elastic force of the coil spring 422. Then the valve element 421 is separated from the valve seat 423, so that the cleaning liquid flows from the flow passage 52A to the flow passage 53A.

The cleaning liquid flow passages 52 and 53 are provided with the cam follower 43 and the poppet valve 42. Thus, the cleaning liquid is supplied only to the spindle 35A which is connected to the center shaft 29c and rotatable, and the supply of the cleaning liquid to the other spindle 35B can be cut off. Because the cleaning liquid supplied to the spindle 35A is jetted from the nozzle 36A fixed to the spindle 35A, high-pressure water is jetted only from the nozzle 36A connected to the center shaft 29c thorough the spindle 35A, and the jetting of high-pressure water from the other nozzle 36B can be stopped.

<Nozzle>

The spindle 35 is provided with a variety of nozzles 36 so that cleaning liquid can be jetted from the tip of each of the nozzles 36. The nozzle 36 or the rotary tool 37 (see FIG. 4) is rotated or positioned together with the spindle 35 and performs the operation programmed by the moving device 3 for deburring or cleaning.

The nozzle 36 can be selected from nozzles such as: a direct nozzle that has a jetting port at a tip of a rotating shaft, the jetting port being coaxial with the rotating shaft; an L-type nozzle that has an extension shaft coaxial with a rotating shaft, and a single jetting port extending in a direction perpendicular to the rotating shaft from a tip portion of the extension shaft; and a lance nozzle that has an extension shaft coaxial with a rotating shaft, and two jetting ports extending in diametrically opposite directions from tip portions of the extension shaft. The functions of rotation and positioning in the rotational direction of the center shaft 29c provide advantages capable of rotating the nozzle 36 or determining the position in the rotational direction of the jetting port depending on the nozzle 36 to be used, thereby allowing a wide variety of high pressure washing or deburring.

<Rotary Tool>

Figure 4:
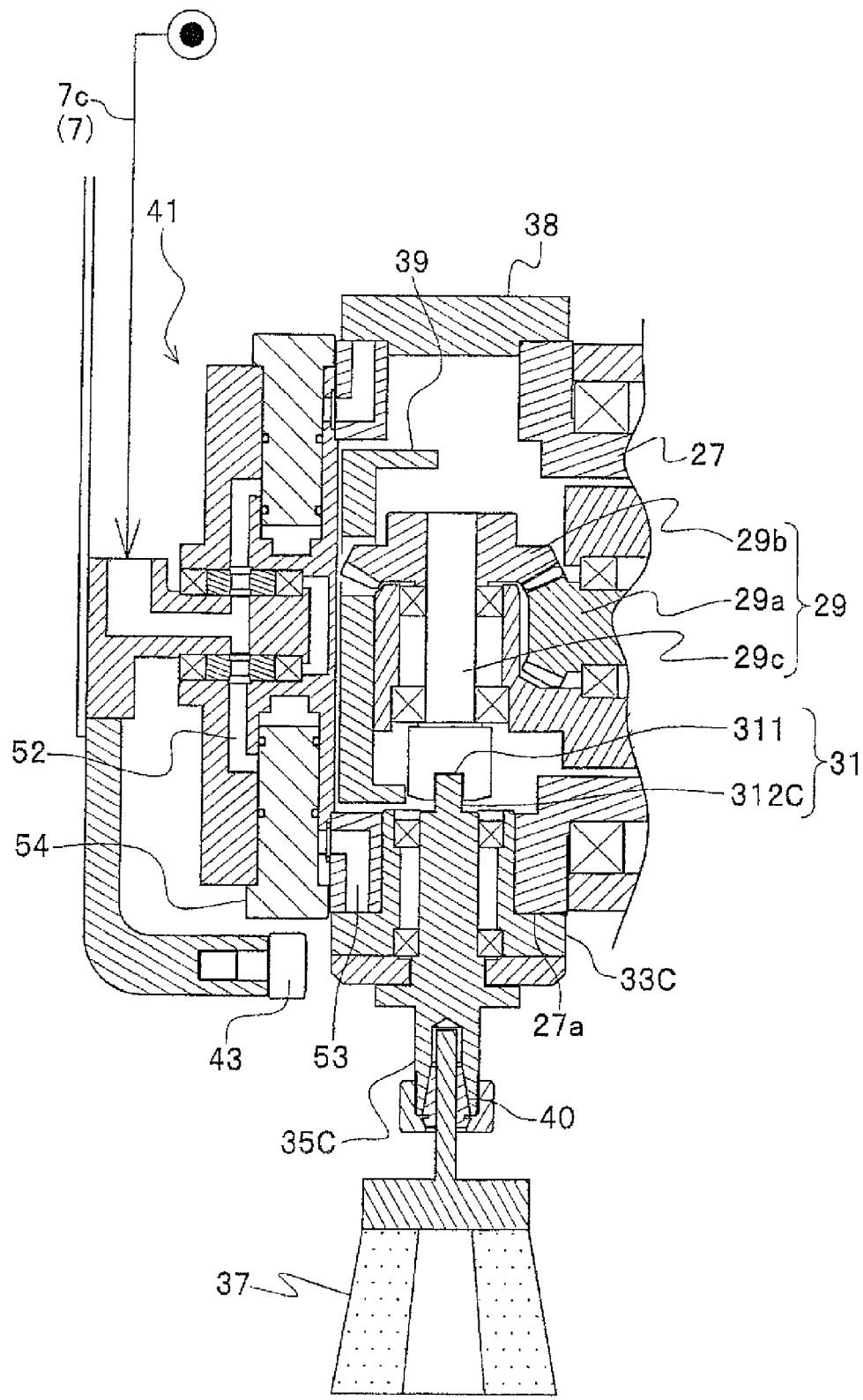
FIG. 4 is a sectional view of a spindle with a brush mounted.

Referring to FIG. 4, the case where the rotary tool 37, such as a brush, is used in place of the nozzle 36 will be described.

A supporting member 33C with no cleaning liquid flow passage provided therein is disposed on the turret face 27a. A plug 54 is fixed in between the flow passages 52 and 53 in place of the poppet valve 42. The plug 54 interrupts the flow of cleaning liquid into the flow passage 53.

A rotary tool spindle 35C is journaled within the supporting member 33C by a bearing. The spindle 35C includes a locking piece 312C on an end surface thereof toward the center shaft 29c and a collet 40 on the other end and does not include a cleaning liquid flow passage inside. The rotary tool 37 is fixed to the spindle 35C by the collet 40.

A cup brush, a twisted brush, a drill, an end mill or the like may be used as the rotary tool 37. By using the rotary tool 37, strong burrs which cannot be eliminated by high-pressure water can be removed.

As described above, the turret device 10 according to the first embodiment includes: the spindle 35 for mounting the nozzle 36 or the rotary tool 37; the turret 27 having the plurality of turret faces 27a for mounting the spindle 35; the spindle drive device 11 having a function of indexing the rotation angle of the spindle 35; the turret drive device 12 for turning and indexing the turret 27; the turret drive shaft 21 as a hollow shaft disposed coaxially with the turning center shaft 27b of the turret 27 for transmitting power of the turret drive device 12 and journaled in the quill 18; the drive shaft 22 coaxially journaled within the turret drive shaft 21 for transmitting rotation of the spindle drive device 11; the first transmission portion 25 for transmitting the rotation of the turret drive shaft 21 to the turret 27; the second transmission portion 29 having the center shaft 29c for transmitting the rotation of the drive shaft 22 through the center shaft 29c to the spindle 35 specified by the index of the turret 27; and the engaging portion 31 for realizing engagement between the center shaft 29c and the spindle 35 when the turret 27 is indexed, while releasing the engagement when the turret 27 is turning.

The turret device 10 according to the first embodiment is constructed as above, thereby providing the following advantages.

That is, the quill 18, the turret drive shaft 21, the drive shaft 22, and the turret 27 rotate about the same axis, thereby allowing an easy improvement in coaxial accuracy after the shafts are assembled. Furthermore, because each component has the shape of a rotating body, machining with high accuracy is facilitated. This results in the advantage of a reduction in manufacturing costs of the turret device 10. Also, there is provided the advantage of improving the reliability of turning and angle indexing of the turret 27 and rotation and angle indexing of the spindle 35.

That is, it is possible to provide the turret device 10 used for the turret-type cleaning machine 100 which allows an improvement in the mounting accuracy of the turret drive shaft 21, the drive shaft 22, and the turning center shaft 27b of the turret 27.

Also, the turret device 10 includes the second transmission portion 29 and the engaging portion 31. Thus, the rotation of the spindle drive device 11 is transmitted through the drive shaft 22 only to the spindle 35 specified by the index of the turret 27 out of the plurality of spindles 35 arranged on the turret 27. This provides the advantages of allowing the use of only the power to be required and facilitating operation confirmation by specifying a portion to be driven.

Furthermore, in the first embodiment, the center shaft 29c is journaled coaxially with the spindle 35, and the second transmission portion 29 further includes the gear mechanism that transmits the rotation of the drive shaft 22 to the center shaft 29c. The engaging portion 31 includes: the receiving portion 311 as a recessed groove provided at an end of the center shaft 29c and extending linearly; and the locking piece 312 as a protruding portion provided at an end of the spindle 35 and engageable with the receiving portion 311 for transmission of rotation. The locking piece 312 and the receiving portion 311 are disengaged by turning the turret 27 in a state where the extending direction of the receiving portion 311 is positioned parallel to a trajectory of the spindle 35 drawn by the turning of the turret 27, and are engaged when the turret 27 is indexed.

With this construction, it is possible to simply construct the second transmission portion 29 and the engaging portion 31.

Furthermore, the turret device 10 according to the first embodiment includes: the rotating manifold 41 disposed on the turret 27 coaxially with the turning center shaft 27b of the turret 27; and the flow passages 52 and 53 communicating from the rotating manifold 41 to the spindle 35.

With this construction, the supply of cleaning liquid to the spindle 35 rotatably mounted to the turret faces 27a can be realized with a simple construction.

Second Embodiment

Next, referring to FIGS. 5 and 6, a second embodiment of the present invention will be described in terms of differences between the above-described first embodiment and this embodiment, and the repetition of the description of similarities therebetween is omitted as appropriate.

Figure 5:
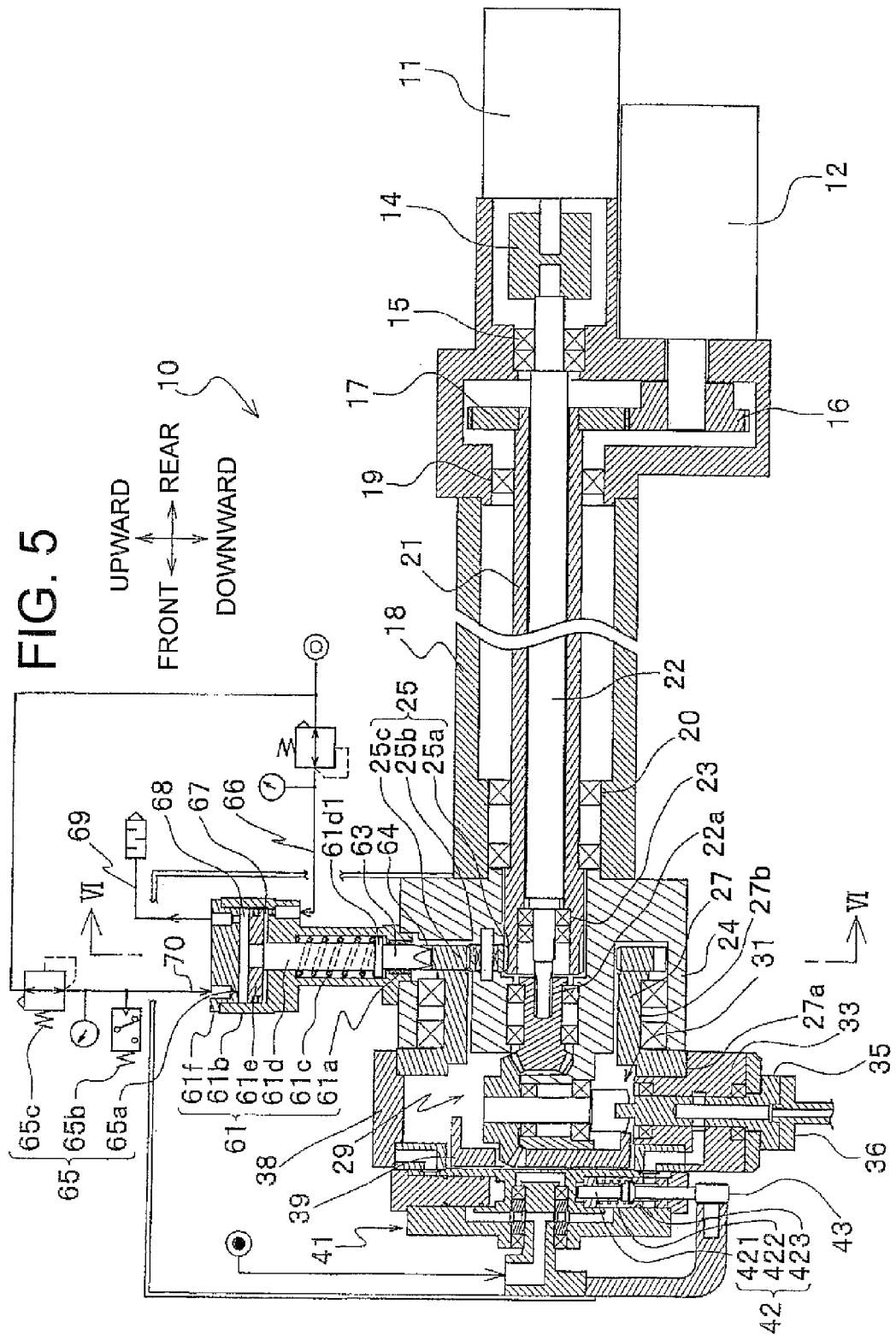
FIG. 5 is a longitudinal sectional view of a turret device with a plunger according to a second embodiment of the present invention.
Figure 6:
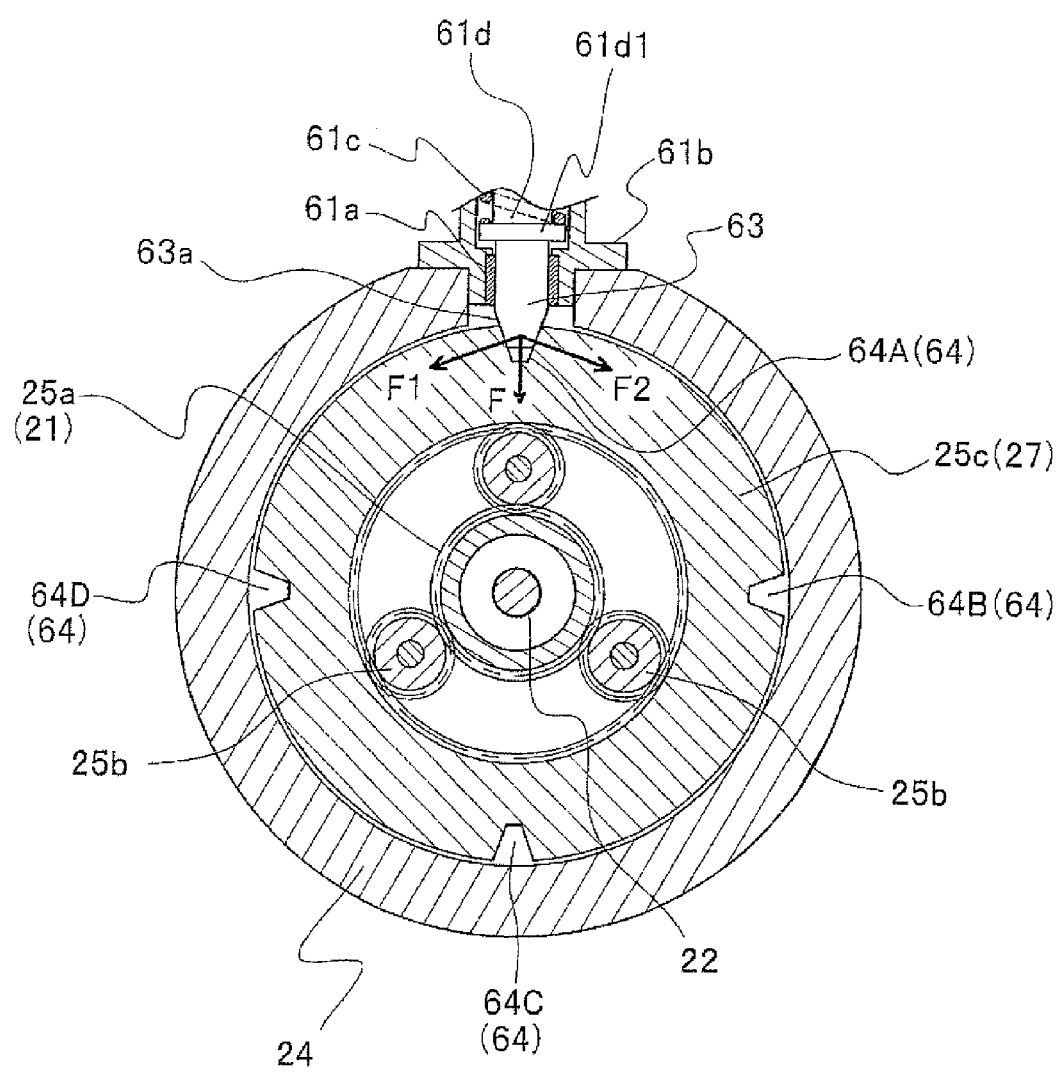
FIG. 6 is a sectional view taken along line VI-VI of FIG. 5.

Referring mainly to FIG. 5, the second embodiment of the present invention is shown, in which the turret device 10 having the four turret faces 27a according to the first embodiment is further provided with a plunger 63 serving as a clamping member, a pneumatic cylinder 61 serving as a clamping member moving portion, and a detector 65 serving as a pneumatic seating switch in this embodiment, and further includes a V-groove 64 as a groove of generally V-shaped cross section on an outer circumferential surface of the internal gear 25c.

<Clamping Member>

The plunger 63 is provided on a vertical plane passing the turning center shaft 27b of the turret 27 and vertically moved by the cylinder 61. The plunger 63 has, at a tip thereof, a V-surface 63a serving as a protrusion of generally V-shaped cross section having the shape corresponding to the V-groove 64 (see FIG. 6). Two sides constituting the V-surface 63a are symmetrical with respect to the vertical plane.

The cylinder 61 is disposed on the vertical plane passing the turning center shaft 27b of the turret 27 in the turret base 24. A bushing 61a is internally provided at a lower end of a cylinder body 61b. A piston 61e is disposed in a vertically slidable manner within the cylinder body 61b. A piston shaft 61d having a flange surface 61d1 is fixed below the piston 61e. A coil spring 61c as an elastic body, with the piston shaft 61d as a guide, is provided below the cylinder body 61b above the flange surface 61d1. The urging force of the coil spring 61c urges the piston shaft 61d downward. The piston shaft 61d is formed integrally with the plunger 63.

It should be noted that a disc spring may be used in place of the coil spring 61c. Alternatively, the piston shaft 61d and the plunger 63 may be constructed separate from each other and fitted and joined together.

A pneumatic pipe 66 is provided for feeding compressed air to an air chamber 67, the air chamber 67 being defined by the cylinder body 61b and the piston 61e and located below the piston 61e. The pneumatic pipe 66 is provided with a switching valve (not shown). The switching valve switches the introduction and discharge of compressed air into and from the air chamber 67.

An end-plate 61f is disposed at an upper end of the cylinder body 61b. The end-plate 61f is provided with a pipe 69 for discharging air from an air chamber 68, the air chamber 68 being defined by the cylinder body 61b, the piston 61e, and the end-plate 61f and located above the piston 61e.

The bushing 61a slides with the plunger 63 to prevent inclination of the plunger 63. The plunger 63 is held by the presence of the bushing 61a against sliding with the cylinder body 61b, thereby preventing the wear of the cylinder body 61b.

On outer circumferential surfaces of the internal gear 25c, there are provided the same number of V-grooves 64A 64B, 64C, and 64D, circumferentially equally spaced apart, as the number of indexes of the turret 27. Two sides (side surfaces) constituting the V-groove 64 are provided in a radially symmetrical manner. It should be noted that the V-groove 64 is a collective term for the V-grooves 64A, 64B, 64C, and 64D. The angle between the two sides of the V-groove 64 is the same as that of the V-surface 63a at the tip of the plunger 63.

The internal gear 25c is disposed on the turret 27 such that the V-groove 64 faces upward in the vertical direction when the turret face 27a is indexed, and such that its center shaft is coaxial with the turning center shaft 27b of the turret 27.

When compressed air in the air chamber 67 is discharged by the switching valve (not shown), the piston 61e is moved downward by the restoring force of the coil spring 61c. At the same time, the air chamber 68 draws in the air through pipe

69. The plunger 63 disposed at the tip of the piston shaft 61*d* is inserted into the V-groove 64 provided in the internal gear 25*c*.

At this time, the V-surface 63*a* of the plunger 63 abuts against the V-groove 64 of the internal gear 25*c*. Further, the plunger 63 is urged toward the internal gear 25*c* by a restoring force F of the coil spring 61*c* (see FIG. 6). The V-surface 63*a* applies, to the internal gear 25*c*, two component forces F1 and F2 of the restoring force F in a direction perpendicular to the V-surface 63*a*, the component forces F1 and F2 being mutually equal in a circumferential direction and oppositely directed. Furthermore, the plunger 63 is maintained in a vertical attitude by the bushing 61*a*. With these synergistic effects, the plunger 63 clamps the internal gear 25*c* in a rotational direction thereof. Because the internal gear 25*c* is fixed to the turret 27, the insertion of the plunger 63 into the V-groove 64 restrains the turret 27 from turning.

When compressed air is introduced into the air chamber 67, the piston 61*e* moves upward under the pressure of the compressed air against the elastic force of the coil spring 61*c*. At this time, air is discharged from the air chamber 68 through the pipe 69.

When the piston 61*e* moves upward, the plunger 63 disposed at the tip of the piston shaft 61*d* is removed from the V-groove 64, so that the turret 27 fixed to the internal gear 25*c* can turn.

It should be noted that although in this embodiment, the single-acting cylinder with the coil spring is used as the cylinder 61 serving as a clamping member moving portion, it may be changed to a double-acting cylinder. Alternatively, a clamping member having a V-shaped cross section may be used in place of the plunger 63, and a toggle mechanism and other link mechanisms may be used as a clamping member moving portion.

<Detector>

A nozzle 65*a* is provided in the end-plate 61*f*. A pipe 70 is connected to the nozzle 65*a*. The pipe 70 is provided with a pressure switch 65*b* for monitoring pressure in the pipe 70 and a regulator 65*c* for maintaining the pressure in the pipe 70 constant. The pressure of air to be introduced into the nozzle 65*a* is set sufficiently lower than the pressure in the air chamber 67.

When the piston 61*e* moves upward and reaches the end-plate 61*f*, the plunger 63 is completely removed from the V-groove 64 and the piston 61*e* closes the nozzle 65*a*. Then the pressure in the pipe 70 increases. And then when the pressure reaches a set pressure of the regulator 65*c*, the pressure switch 65*b* generates a set pressure reaching signal. Therefore, the detector 65 can confirm that the piston 61*e* reaches the upper end.

On the other hand, when the piston 61*e* does not reach the end-plate 61*f*, the piston 61*e* does not close the nozzle 65*a*, and therefore the air flowing through the pipe 70 is discharged from the pipe 69. In this case, because the pressure in the pipe 70 does not increase, the pressure switch 65*b* does not generate the set pressure reaching signal. Therefore, the detector 65 can confirm that the piston 61*e* does not reach the upper end.

The detector 65 only needs to detect whether the plunger 63 is in a retracted position to allow turning of the turret 27. For example, the arrangement may be such that a dog is provided on the plunger 63 or the piston 61*e*, and a detector for detecting the dog is provided so as to detect that the plunger 63 does not exist in a region where it interferences with the turret 27 during turning.

As described above, the turret device 10 according to the second embodiment includes: the plunger 63 for clamping the turret 27; the cylinder 61 for moving the plunger 63 between two positions, i.e., a clamping position where the turret 27 is clamped and an unclamping position where the turret 27 is released; and the detector 65 for detecting that the plunger 63 is in a position retracted from a turning region of the turret 27.

The turret device 10 according to the second embodiment is constructed as above, thereby providing the following advantages.

That is, the turret 27 with an angle indexed, that is, the turret 27 with a rotation angle position determined, is fixed by the plunger 63, thereby preventing the turret 27 from being displaced in a circumferential direction.

Here, when the turret 27 turns with the plunger 63 not completely removed from the V-groove 64, the plunger 63 interferences with the turret 27, and an excessive torque is transmitted to the turret drive device 12. This might cause a serious trouble in the turret drive device 12 and drive systems.

However, according to this embodiment, the detector 65 can confirm whether or not the piston 61*e* reaches the upper end and the plunger 63 is completely removed from the V-groove 64. Therefore, when the plunger 63 is in a position retracted from the turning region of the turret 27, the turret 27 is turned, thereby preventing interference between the turret 27 and the plunger 63 and preventing the turret device 10 from being broken.

Furthermore, because no electric components are disposed within the high-humidity cleaning chamber 4, breakage of the electric components due to vapor can be prevented. Therefore, the reliability of the device can be improved.

Furthermore, in the second embodiment, the V-groove 64 of generally V-shaped cross section moving in conjunction with the turret 27 is provided. The plunger 63 includes the V-surface 63*a* serving as a protrusion of generally V-shaped cross section having the shape corresponding to the V-groove 64. The plunger 63 clamps the turret 27, with the V-surface 63*a* abutting against and urging the V-groove 64 in the clamping position.

With this construction, the generally V-shaped cross section of the V-surface 63*a* of the plunger 63 abuts against and urges the V-groove 64 of generally V-shaped cross section moving in conjunction with the turret 27 to cause the component forces of the urging force to act in the direction perpendicular to the two side surfaces of the V-groove 64, thereby allowing reliable clamping of the turret 27.

Moreover, in the second embodiment, the first transmission portion 25 includes: the drive gear 25*a* provided on the turret drive shaft 21; the idler gears 25*b* meshing with the drive gear 25*a*; and the internal gear 25*c* provided on the turret 27 to mesh with the idler gears 25*b*. The V-groove 64 is included in the internal gear 25*c* provided on the turret 27.

With this construction, the rotation of the turret drive shaft 21 is transmitted to the turret 27 through the idler gears 25*b*, thereby allowing reliable transmission of power.

Furthermore, the plunger 63 is inserted into the V-groove 64 included in the internal gear 25*c* that is provided on the turret 27 and to which the rotation from the turret drive shaft 21 is directly transmitted, thereby reliably restraining the turret 27 from turning.

Although in this embodiment, the pneumatic seating switch is used as the detector 65 for detecting the unclamping position of the plunger 63, it may be replaced with a proximity switch, a contact switch, a limit switch, an automatic switch and other position detecting sensors.

As for the rest, this embodiment is of similar construction to the first embodiment, and the detailed description will not be repeated.

While the above is a description of two embodiments of the present invention, the present invention is not limited to the constructions of the above-described embodiments and changes can be made as appropriate.

For example, although in the above-described embodiment, the receiving portion 311 is provided at an end of the center shaft 29c and the locking piece 312 is provided at an end of the spindle 35, the present invention is not limited thereto. The present invention may employ the construction in which the receiving portion 311 is provided at an end of the spindle 35 and the locking piece 312 is provided at an end of the center shaft 29c. In this case, in order to restrain the spindle 35 from rotating, a construction is required in which a flat surface allowing the guide 39 to slide thereon is formed at an appropriate portion of a side surface of the spindle 35, or the guide 39 slides in engagement with the receiving portion 311.

Furthermore, although in the above-described embodiment, the locking piece 312 has a substantially flat plate shape, the present invention is not limited thereto. As the locking piece 312, the arrangement may be such that a plurality of almost columnar pins are erected in a linearly aligned manner or such that a plurality of flat plates with surfaces arranged substantially flush are erected in a linearly aligned manner.

In addition, although in the above-described embodiment, the V-groove 64 is provided in the internal gear 25c, the present invention is not limited thereto. The V-groove 64 may be provided at an appropriate portion of the turret 27 other than the internal gear 25c.

What is claimed is:

1. A turret device used for turret-type cleaning machines for deburring or cleaning workpieces with a nozzle or a rotary tool, comprising:
   a spindle mounting the nozzle or the rotary tool;
   a turret having a plurality of turret faces, the turret faces mounting the spindle;
   a spindle drive device having a function of indexing a rotation angle of the spindle;
   a turret drive device turning and indexing the turret;
   a turret drive shaft as a hollow shaft disposed coaxially with a turning center shaft of the turret and journaled in a quill, the turret drive shaft transmitting power of the turret drive device;
   a drive shaft coaxially journaled within the turret drive shaft, the drive shaft transmitting rotation of the spindle drive device;
   a first transmission portion transmitting rotation of the turret drive shaft to the turret;
   a second transmission portion having an output shaft, the second transmission portion transmitting rotation of the drive shaft through the output shaft to the spindle specified by the index of the turret;
   an engaging portion realizing engagement between the output shaft and the spindle when the turret is indexed and releasing the engagement when the turret is turning;
   a clamping member clamping the turret;
   a clamping member moving portion moving the clamping member between two positions comprising a clamping position where the turret is clamped and an unclamping position where the turret is released;
   a detector detecting whether the clamping member is in a position retracted from a turning region of the turret; and
   a groove of generally V-shaped cross section moving in conjunction with the turret, wherein:
       the clamping member comprises a plunger that includes a protrusion of a generally V-shaped cross section having a shape corresponding to the groove, and the plunger clamps the turret, with the protrusion abutting against and urging the groove in the clamping position.

2. The turret device according to claim 1, wherein the first transmission portion includes:
   a drive gear provided on the turret drive shaft;
   an idler gear meshing with the drive gear; and
   an internal gear provided on the turret to mesh with the idler gear, and the groove is included in the internal gear provided on the turret.

3. The turret device according to claim 1, wherein:
   the output shaft is a center shaft journaled coaxially with the spindle;
   the second transmission portion further includes a gear mechanism transmitting the rotation of the drive shaft to the center shaft;
   the engaging portion includes a receiving portion as a recessed groove provided at one end of the center shaft and the spindle and extending linearly, and a locking piece as a protruding portion provided at the other end of the center shaft and the spindle and engageable with the receiving portion for transmission of rotation; and
   the locking piece and the receiving portion are disengaged by turning the turret in a state where an extending direction of the receiving portion is positioned parallel to a trajectory of the spindle drawn by the turning of the turret, and are engaged when the turret is indexed.

4. The turret device according to claim 1, further comprising:
   a rotating manifold disposed on the turret coaxially with the turning center shaft of the turret; and
   a flow passage communicating from the rotating manifold to the spindle.

5. The turret device according to claim 2, wherein:
   the output shaft is a center shaft journaled coaxially with the spindle;
   the second transmission portion further includes a gear mechanism transmitting the rotation of the drive shaft to the center shaft;
   the engaging portion includes a receiving portion as a recessed groove provided at one end of the center shaft and the spindle and extending linearly, and a locking piece as a protruding portion provided at the other end of the center shaft and the spindle and engageable with the receiving portion for transmission of rotation; and
   the locking piece and the receiving portion are disengaged by turning the turret in a state where an extending direction of the receiving portion is positioned parallel to a trajectory of the spindle drawn by the turning of the turret, and are engaged when the turret is indexed.

6. The turret device according to claim 2, further comprising:
   a rotating manifold disposed on the turret coaxially with the turning center shaft of the turret; and
   a flow passage communicating from the rotating manifold to the spindle.

7. The turret device according to claim 3, further comprising:
   a rotating manifold disposed on the turret coaxially with the turning center shaft of the turret; and
   a flow passage communicating from the rotating manifold to the spindle.

8. The turret device according to claim 5, further comprising:
   a rotating manifold disposed on the turret coaxially with the turning center shaft of the turret; and
   a flow passage communicating from the rotating manifold to the spindle.

* * * * *